(12) United States Patent
Wickel et al.

(10) Patent No.: US 6,881,933 B2
(45) Date of Patent: Apr. 19, 2005

(54) HEATING DEVICE WITH AN ELECTRICAL HEAT SOURCE FOR HEATING A FLUID IN A FLUID LINE OF A MOTOR VEHICLE

(75) Inventors: Uwe Wickel, Schrecksbach (DE);
Frank Bahner, Offenbach/Main (DE);
Andreas Bauer, Schneeberg (DE);
Marc Rastetter, Schöneck (DE);
Oliver Strauss, Nidderau (DE); Jürgen Böhm, Obertshausen (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/860,860

(22) Filed: Jun. 4, 2004

(65) Prior Publication Data

US 2004/0251248 A1 Dec. 16, 2004

(30) Foreign Application Priority Data

Jun. 14, 2003 (DE) ........................................ 103 26 894

(51) Int. Cl.[7] .............................................. H05B 3/58
(52) U.S. Cl. ........................................ 219/535; 219/540
(58) Field of Search ................................. 219/535, 530, 219/540, 202; 392/480

(56) References Cited

U.S. PATENT DOCUMENTS

| | | | | |
|---|---|---|---|---|
| 3,475,597 A | * | 10/1969 | Desloge ....................... | 219/535 |
| 4,128,918 A | * | 12/1978 | Wenk .......................... | 24/16 R |
| 4,292,503 A | * | 9/1981 | Brent .......................... | 219/535 |
| 5,359,179 A | * | 10/1994 | Desloge et al. .............. | 219/535 |

FOREIGN PATENT DOCUMENTS

EP            11558158          11/2001

* cited by examiner

Primary Examiner—Robin O. Evans
Assistant Examiner—Vinod Patel
(74) Attorney, Agent, or Firm—Friedrich Kueffner

(57) ABSTRACT

A heating device includes an electrical heat source for heating a fluid in a fluid line of a motor vehicle, and a heat conducting device which is in connection with the heat source. The heat conducting device is connected with a hose clamp for connecting the heat conducting device to the fluid line. The heat conducting device may include a metal strip, the one end of which is in contact with the heat source and the other end is connected to the clamp. This metal strip facilitates the heat transfer from the heat source through the clamp to the fluid line.

10 Claims, 5 Drawing Sheets

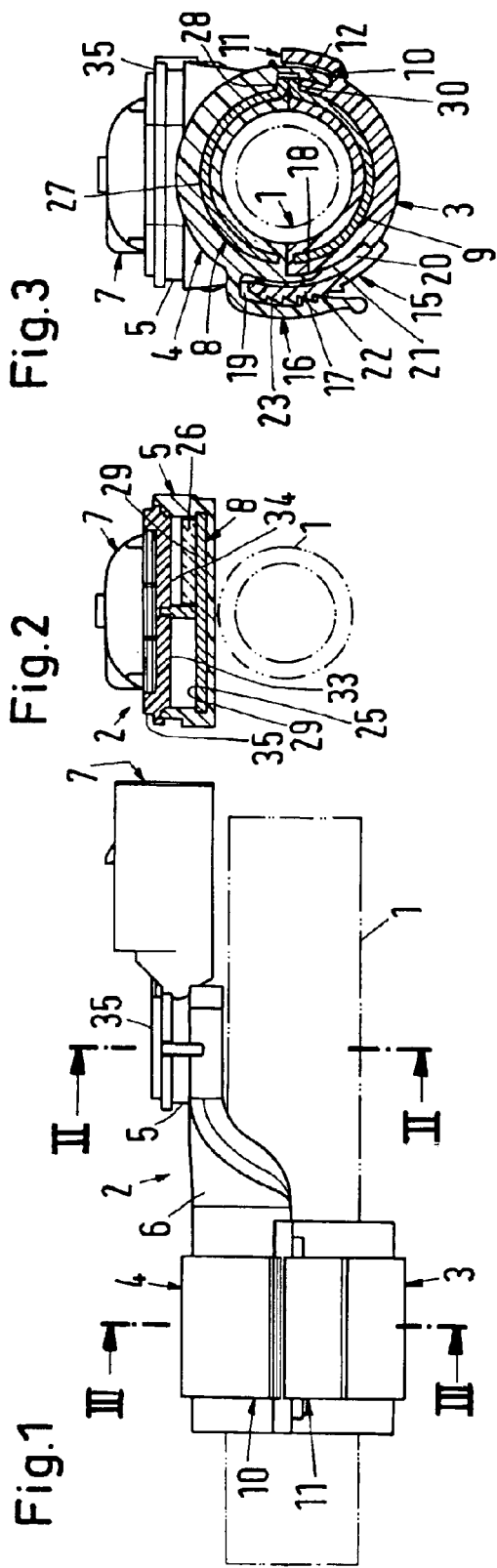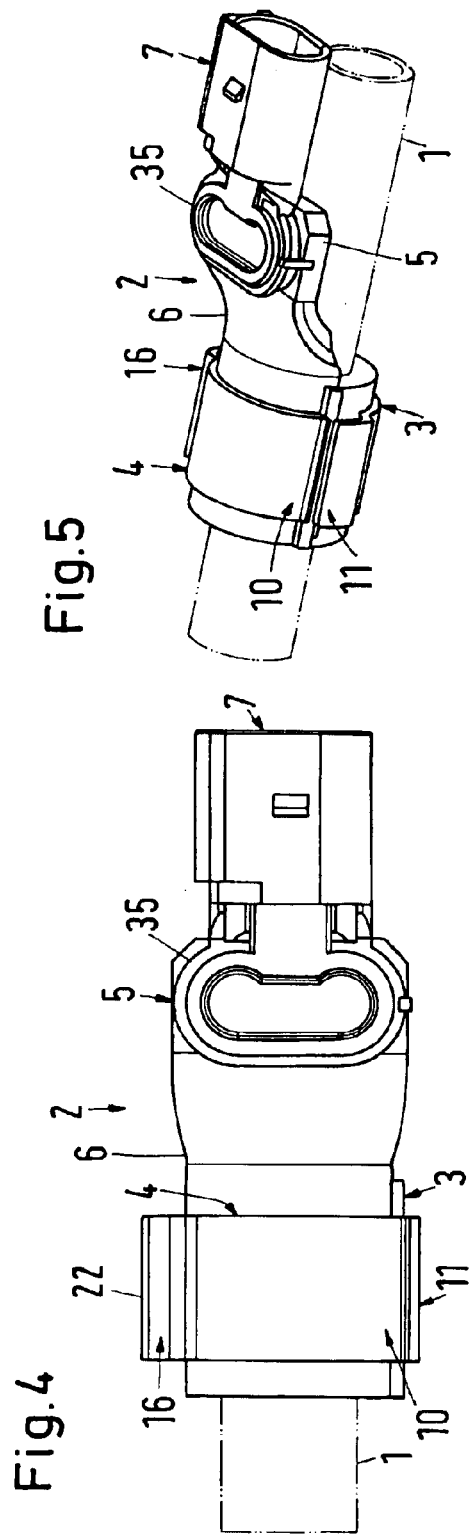

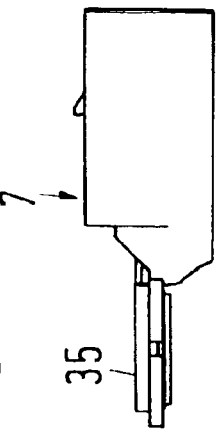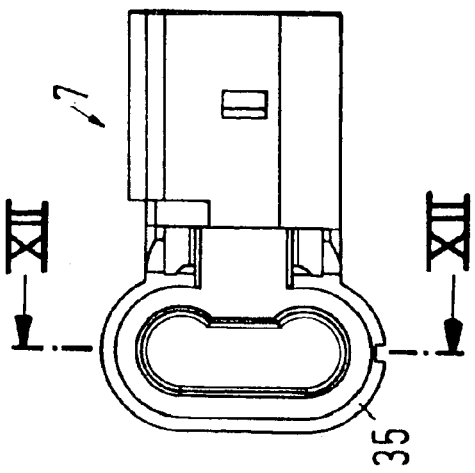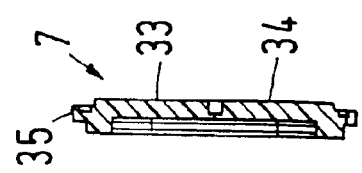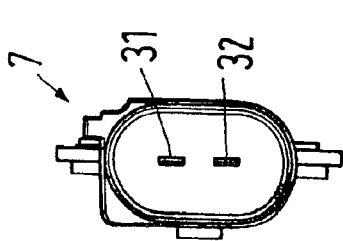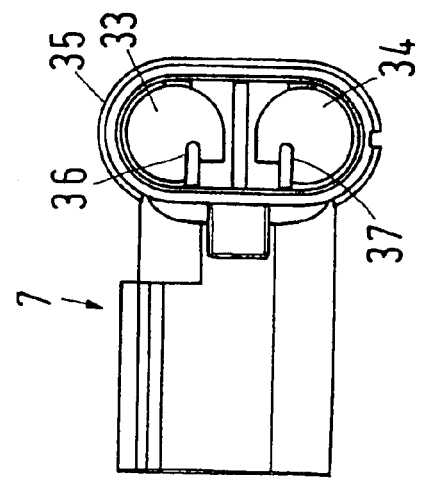

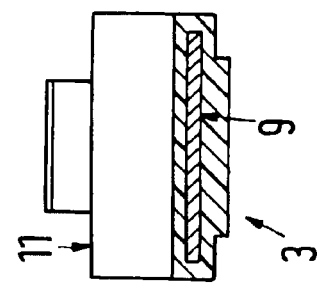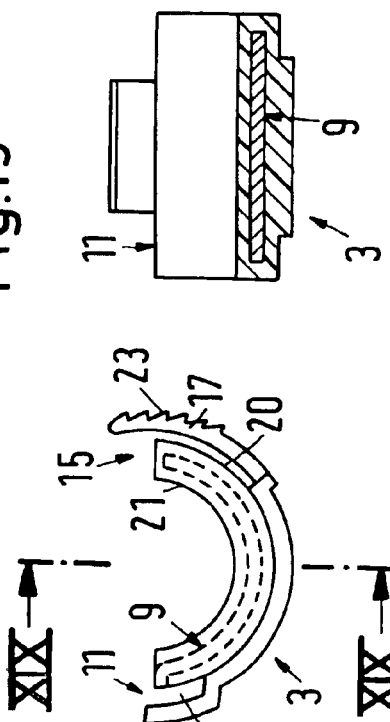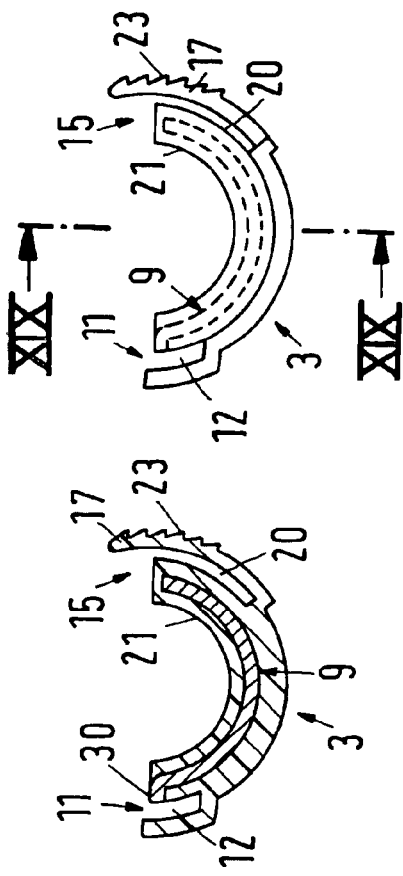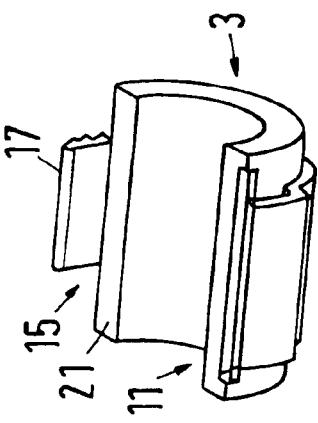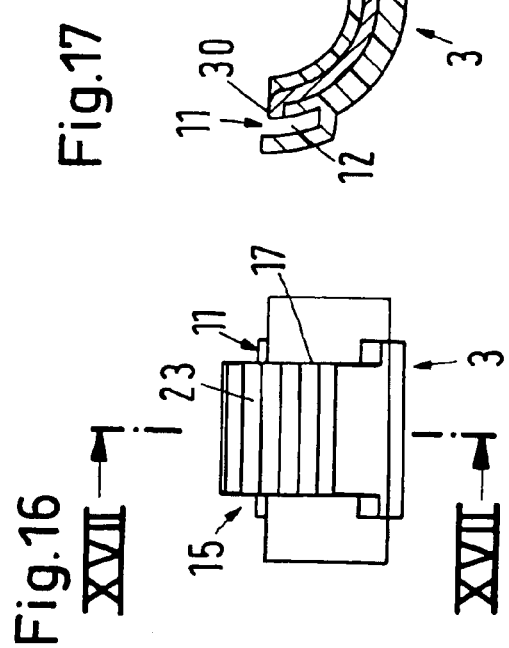

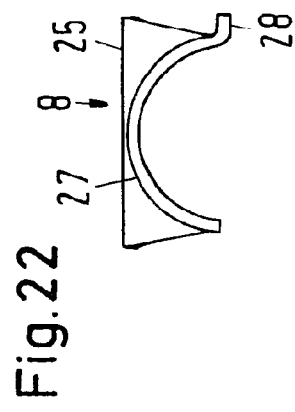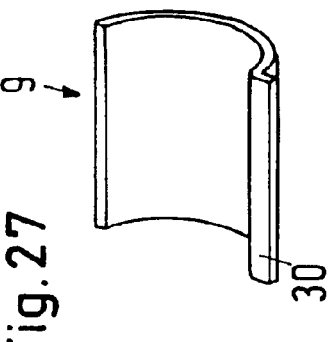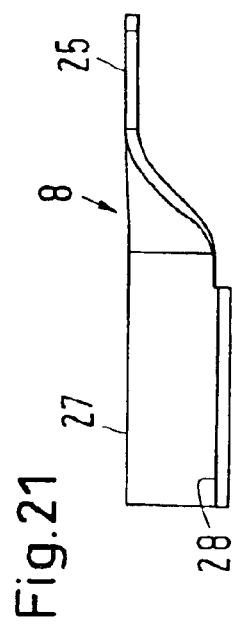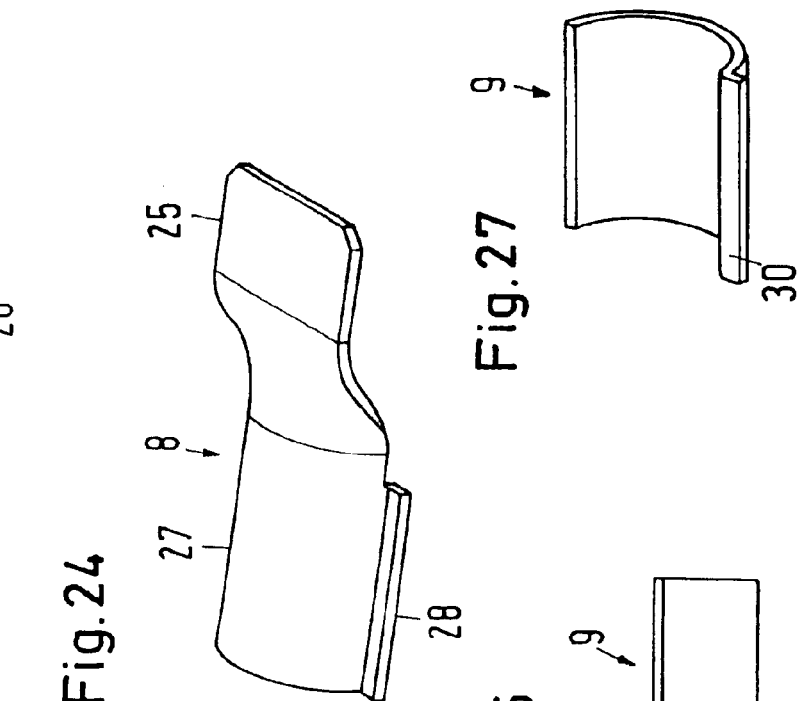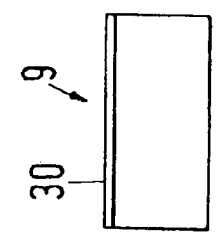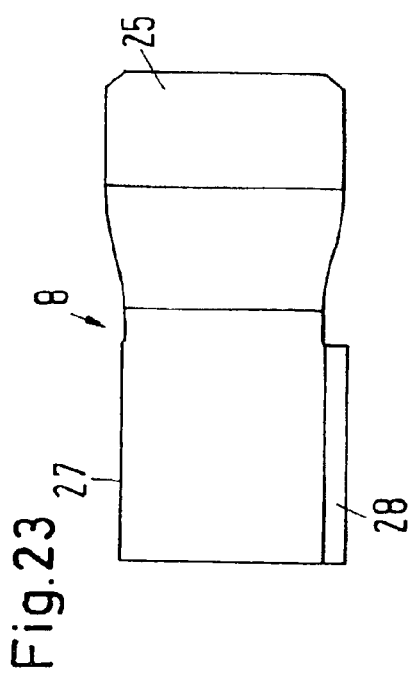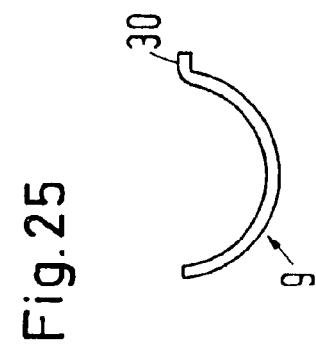

HEATING DEVICE WITH AN ELECTRICAL HEAT SOURCE FOR HEATING A FLUID IN A FLUID LINE OF A MOTOR VEHICLE

BACKGROUND OF THE INVENTION

1. Field of the Invention

The invention relates to a heating device with an electrical heat source for heating a fluid in a fluid line of a motor vehicle, and with a heat conducting device which is in connection with the heat source.

2. Description of the Related Art

A heating device of the above-described type is disclosed in EP 1158158 A1. In this known heating device, the cover of a housing is integrally connected to a separate fluid line part which can be coupled into the flow of the fluid line in order to electrically heat the diesel fuel conducted through the fluid line at low temperatures. However, various locations of a fluid line are frequently subjected to lower temperatures; these locations must first be determined by conducting tests. Therefore, it is not always possible to dimension the fluid lines from the outset in such a way that the fluid line piece with the heating device can be mounted precisely at that location where the temperature is the lowest.

SUMMARY OF THE INVENTION

Therefore, it is the primary object of the present invention to provide a heating device of the above-described type which permits a greater flexibility with respect to the configuration of the fluid line.

In accordance with the present invention, the heat conducting device is connected with a hose clamp for connecting the heat conducting device to the fluid line.

In the solution provided in accordance with the present invention, the clamp makes it possible to mount the heating device almost at any desired location of the fluid line where the fluid line is subjected to lower temperatures without having to interrupt the fluid line at such a location.

In accordance with a preferred embodiment, the heat conducting device includes a metal strip, the one end of which is in contact with the heat source and the other end is connected to the clamp. This metal strip facilitates the heat transfer from the heat source through the clamp to the fluid line.

The clamp may be composed of two parts which at one end thereof can be inserted one into the other in an articulated manner and at the other end can be connected by a closure. Such a configuration of the clamp facilitates a simple mounting of the clamp on the fluid line.

It may be possible to tension the closure. The closure makes it possible to mount the heating device on fluid lines having different circumferences as long as the circumference is within the tensioning range of the clamp.

A closure which is particularly simple to operate is a snap-in closure.

If the closure has at the ends of the clamp parts to be connected two toothings which can be placed into engagement, the closure can be adjusted to different fluid line diameters depending on the number of different teeth which can be placed into engagement.

One of the toothings may be formed in a recess in one of the ends of one of the clamp parts to be connected by the closure and the other end of the clamp parts to be connected by the closure may be insertable into the recess. In this manner, an unintentional opening of the closure is substantially prevented.

In accordance with a preferred feature, the metal strip has a curved surface. This curved surface facilitates a heat transfer into the fluid line over a large surface area.

In addition, at least in an end portion of the metal strip connected to one of the clamp parts, the curved surface may have an axis of curvature which is concentric to the center axis of the fluid line. As a result, the curved surface facilitates an intimate connection of the heating device with the fluid line.

In accordance with another preferred feature, the clamp parts are manufactured by injection molding. This facilitates a simple manufacture of the clamp parts, particularly if the clamp parts include thermoplastic material.

The thermoplastic material of the clamp may be injection molded around the metal strip. The metal strip can then be manipulated essentially as if it were constructed integrally with the clamp part. In this connection, it is preferably ensured that the plastic material surrounding the metal strip is shaped on the end of the metal strip facing away from the clamp as a receptacle for receiving the heat source and the plastic material in the receptacle leaves free at least one contact surface of the metal strip for being thermally and electrically contacted by at least one heating element of the heat source. This makes possible a simple assembly of the heating element or of every heating element at the metal strip.

The receptacle may be closed by a cover part which is welded to the receptacle and is part of a plug-in socket of thermoplastic material provided for inserting a plug connected to a current supply line. The contacts of the plug-in socket are connected to the metal strip, on the one hand, and, on the other hand, to at least one contact at the inner side of the cover part, wherein the heating element or every heating element arranged in the receptacle is in contact with a contact surface of the contact strip and with a contact at the cover part. This type of current supply for the heating element or every heating element facilitates mounting of the heating device at different locations of a fluid line depending on the length of the current supply line.

Each heating element preferably is a PTC resistor. Such a heating element ensures automatically that a temperature of the heating device corresponding to the configuration of the PTC resistor is maintained independently of the ambient temperature.

In accordance with another feature, it may be ensured that the heat conducting device includes another metal strip in the thermoplastic material of the other clamp part which is in articulated contact with the first metal strip in the area of the clamp joint and which extends in the direction toward the closure. In this embodiment, the heat of the heat source is conducted practically over the entire circumference of the fluid line into the fluid flowing through the line.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

BRIEF DESCRIPTION OF THE DRAWINGS

In the drawing:

FIG. 1 is a side view of an embodiment of the heating device according to the present invention;

FIG. 2 is a cross-sectional view taken along sectional line II—II of FIG. 1;

FIG. 3 is a cross-sectional view taken along sectional line III—III of FIG. 1;

FIG. 4 is a top view of the heating device of FIG. 1;

FIG. 5 is a perspective view of the heating device of FIG. 1;

FIG. 11 is a top view of the plug-in socket normally connected to the portion of the heating device illustrated in FIGS. 6–9;

FIG. 12 is a sectional view taken along sectional line XII—XII of FIG. 11;

FIG. 13 is a view as seen from the right hand side of FIG. 1;

FIG. 14 is a bottom view of the plug-in socket;

FIG. 15 is a side view of the plug-in socket;

FIG. 16 is a side view of a clamp part of the heating device of FIG. 1;

FIG. 17 is a sectional view taken along sectional line XVII—XVII of FIG. 16;

FIG. 18 is a front view of the clamp part of FIG. 16;

FIG. 19 is a sectional view along sectional line XIX—XIX of FIG. 18;

FIG. 20 is a perspective view of the clamp part illustrated in FIGS. 16–18;

FIG. 21 is a view of a metal strip of a heat conducting device which is embedded in the portion of the heating device illustrated in FIG. 6 and which serves for transmitting the heat from a heat source to a fluid line;

FIG. 22 is a side view of the metal strip from the left hand side as seen in FIG. 21;

FIG. 23 is a top view of the metal strip of FIG. 21;

FIG. 24 is a perspective view of the metal strip of FIG. 21;

FIG. 25 is a side view of another metal strip which is embedded in the clamp part illustrated in FIGS. 16–20;

FIG. 26 is a view of the other metal strip as seen from the left hand side in FIG. 25; and FIG. 27 is a perspective view of the metal strip of FIG. 25.

DETAILED DESCRIPTION OF THE INVENTION

Figure 6:
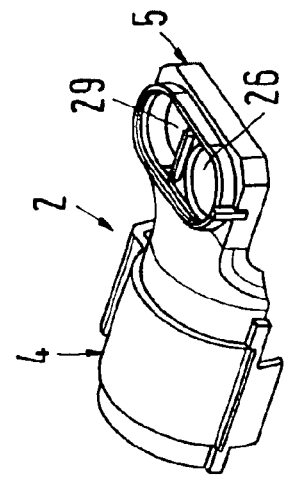
FIG. 6 is a side view of a portion of the heating device of FIG. 1, shown without the plug-in socket which is normally fixedly connected to the heating device and which serves for inserting a plug connected to a current supply line.

The heating device illustrated in FIGS. 1 to 5 serves for heating a fluid, such as diesel fuel or water, which flows through a fluid line 1, partially illustrated in dash-dot lines. The heating device can be mounted at any desired location of the fluid line 1 where the fluid line 1 is subjected to low temperatures and there is the danger that the fluid becomes too cold or freezes.

The heating device is composed of a body part 2, individually illustrated in FIGS. 6 through 10, and a clamp part 3, individually illustrated in FIGS. 16 to 20.

The body part 2 is composed of a clamp part 4, a receptacle 5, a connecting part 6 which connects the clamp part 4 to the receptacle 5, and a plug-in socket 7, illustrated individually in FIGS. 11 to 15.

The clamp composed of the clamp parts 3 and 4 connects a heat source contained in the receptacle 5 to the fluid line 1 through a heat conducting device, composed of two metal strips 8 and 9 which are individually illustrated in FIGS. 21 to 27.

Figure 8:
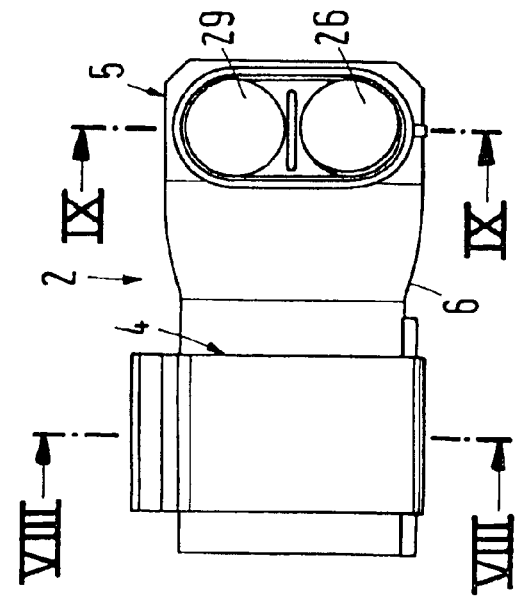
FIG. 8 is a sectional view taken along sectional line VIII—VIII of FIG. 7.

At their ends 10 and 11, seen on the right hand side in FIG. 3, the clamp parts 3 and 4 can be inserted one into the other in an articulated manner, wherein the end 10, seen in FIGS. 3 and 8 of the clamp part 4, engages with play in a recess 12, as seen in FIGS. 3 and 17, of the end 11 which is mouth-shaped or fork-shaped, so that the end 10 can be pivoted in the recess 12.

At their other ends 15 and 16, both clamp parts 3 and 4 are constructed mouth-shaped or fork-shaped, so that they can engage with their legs 17 or 18 in one of the recesses 19 and 20 between the legs 17 and 21 or 18 and 22 of the ends 15 and 16, respectively.

The ends 15 and 16 of the clamp parts 3 and 4 are each provided on the radially outer side of the leg 17 and on the radially inner side of the leg 22 with a toothing 23, as seen in FIGS. 3 and 18, or 24, as seen in FIG. 8 which, as shown in FIG. 3, can be placed into engagement with each other when the leg 17 at the end 15 of the clamp part 3 is inserted into the recess 20 between the legs 17 and 21 and the end 10 of the clamp part 4 is inserted into the recess 12 at the end 11 of the clamp part 3. Consequently, the ends 15 and 16 of the clamp parts 3 and 4 form a locking closure of the clamp which can be tensioned in a stepwise manner, depending on the number of teeth of the toothings 23 and 24.

The metal strip 8 of the heat conducting device is in thermally and electrically conducting contact at its flat end 25, as seen in FIGS. 2, 21 to 24, with at least one heating element in the form of a PTC resistor 26. With its other end 27, which is curved in accordance with the curvature of the clamp part 4, the metal strip 8 is connected to the clamp part 4.

Figure 10:
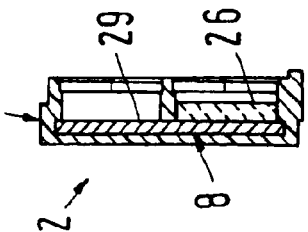
FIG. 10 is a perspective view of the portion of the heating device illustrated in FIG. 6.
Figure 9:
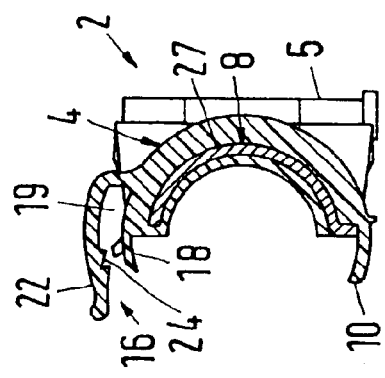
FIG. 9 is a sectional view taken along sectional line IX—IX of FIG. 7.
Figure 7:
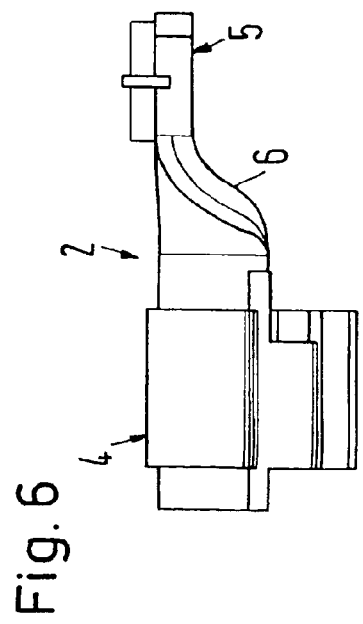
FIG. 7 is a top view of the portion of the heating device illustrated in FIG. 6.

The body part 2, the clamp part 3 as well as the plug-in socket 7 are composed substantially of thermoplastic material, wherein the metal strip 8 is embedded with its end 27 in the plastic material of the clamp part 4, with its middle portion in the plastic material of the connecting part 6 and with its end 25 in the plastic material of the receptacle 7, and wherein, while simultaneously manufacturing the clamp part 4, the connecting part 6 and the receptacle 5 of the same plastic material, the plastics material is injection molded around the metal strip 8 with the exception of a lateral rim which is radially outwardly bent at an end 27 and with the exception of contact surfaces 29, as seen in FIGS. 2 and 10, which are upwardly exposed in the bottom of the receptacle 5. The metal strip 9, shown in FIGS. 3, 25 to 27, is also curved in accordance with the curvature of the clamp part 3 and is surrounded by injection molded plastics material with the exception of a lateral radially outwardly bent rim 30. In the closed state of the clamp shown in FIG. 3, the rims 28 and 30 of the metal strips 8 and 9 are in thermally conducting contact, so that the heat of the heat source is transmitted over a large surface area through the metal strips 8 and 9 over essentially the entire circumference of the fluid line 1 through the wall thereof to the fluid in the fluid line 1. Also contributing to this transmission are the approximately semi-circular curvatures of the metal strips 8 and 9 whose axes of curvature coincide with the axis of the fluid line 1.

The plug-in socket 7 shown in FIGS. 1 to 5 and 11 to 15 serves for inserting a plug which is connected to the battery of a motor vehicle through a current supply line or cable. The plug-in socket 7 also is composed essentially of thermoplastic material into which contact tongues 31 and 32 or pins are injection molded, wherein the tongues or pins remain partially exposed. On the one hand, these contact tongues 31, 32, seen in FIG. 13, are connected to contacts 33, 34 which are molded on the inner side of the cover part 35 of the plug-in socket 7, while leaving contact surfaces exposed for electrical contact with the PTC resistor 26 or every PTC resistor 26 and, on the other hand, the contact tongues 31, 32 are connected to the metal strip 8. After the heat source, i.e., the PTC resistor or resistors 26, is mounted in the receptacle 5, the cover part 35 is welded onto the opening rim of the receptacle 5, for example, by ultrasonic welding or butt-welding, so that the receptacle 5 is tightly closed and the contacts 33, 34, are electrically connected to contact spring elements 36, 37, shown in FIG. 14, to the PTC resistor or resistors 26.

As compared to a heating device which is to be coupled into an interruption of the fluid line 1, the illustrated heating device has the advantage that it can be mounted by means of the clamp 3, 4 at any desired location of the fluid line 1 where there is the danger of excessive cooling or freezing of the fluid flowing through the fluid line 1, wherein it is not necessary that this location is known prior to the manufacture of the motor vehicle, and wherein it is not necessary that the fluid line 1 is severed or interrupted at this location. Moreover, mounting of the heating device on the fluid line is extremely simple.

While specific embodiments of the invention have been shown and described in detail to illustrate the inventive principles, it will be understood that the invention may be embodied otherwise without departing from such principles.

We claim:

1. A heating device comprising an electrical heat source for heating a fluid in a fluid line of a motor vehicle, a heat conducting device in connection with the heat source, wherein the heat conducting device is connected to a clamp for connecting the heating conducting device to the fluid line, wherein the heat conducting device comprises a metal strip having a first end and a second end, wherein the first end of the metal strip is in contact with the heat source and the second end is connected to the clamp, wherein the clamp is comprised of two parts which at one end thereof are insertable one into the other in an articulated manner, and at another end thereof are connectable by a closure, wherein the clamp parts are injection molded parts, wherein the clamp comprises thermoplastic material, wherein the metal strip is surrounded by the thermoplastic material of the clamp, wherein the plastic material surrounding the metal strip is shaped at an end of the metal strip facing away from the clamp as a receptacle for receiving the heat source, and wherein the plastic material in the receptacle leaves free at least one contact surface of the metal strip for a thermal and electrical contact by at least one heating element of the heat source.

2. The heating device according to claim 1, wherein the closure is tensionable.

3. The heating device according to claim 1, wherein the closure is a snap-in closure.

4. The heating device according to claim 1, wherein the closure has at the connectable ends of the clamp parts one of two toothings which can be placed into engagement with each other.

5. The heating device according to claim 4, wherein a first of the toothings is insertable into a recess provided in one of the ends to be connected by the closure.

6. The heating device according to claim 1, wherein the metal strip has a curved surface.

7. The heating device according to claim 6, wherein, at least in an end portion of the metal strip connected to one clamp part, the curved surface has an axis of curvature concentric to a center axis of the fluid line.

8. The heating device according to claim 1, wherein the receptacle is closed by a cover part welded to the receptacle and is part of a plug-in socket of thermoplastic material provided for inserting a plug connected to a current supply line, the plug-in socket having contacts, wherein one contact is connected to the metal strip and the other contact is connected to at least one additional contact at an inner side of the cover part, wherein the at least one heating element arranged in the receptacle is in contact with a contact surface of the metal strip and with a contact at the cover part.

9. The heating device according to claim 1, wherein the at least one heating element is a PTC resistor.

10. The heating device according to claim 1, wherein the heat conducting device has in the thermoplastic material of the upper clamp part another metal strip, wherein the another metal strip is in articulated contact with the metal strip in an area of articulation of the clamp, and wherein the another metal strip extends in a direction toward the closure.

* * * * *